United States Patent
Isono et al.

(10) Patent No.: US 6,249,306 B1
(45) Date of Patent: Jun. 19, 2001

(54) MULTI-BEAM DRAWING METHOD USING PARTIALLY DAMAGED LIGHT EMITTING DEVICES AND INCLUDING SPIRAL CORRECTION

(75) Inventors: Koichi Isono; Takahiro Matsuo, both of Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 09/362,937

(22) Filed: Jul. 28, 1999

(30) Foreign Application Priority Data

Jul. 29, 1998 (JP) .................................................. 10-214616

(51) Int. Cl.[7] .............................. B41J 2/447; B41J 2/47; G06K 15/10
(52) U.S. Cl. ............................. 347/233; 347/234; 358/1.8
(58) Field of Search ..................................... 347/236, 233, 347/238, 234; 358/489, 1.4, 1.6, 1.8, 1.9, 1.16

(56) References Cited

U.S. PATENT DOCUMENTS

| | | | |
|---|---|---|---|
| 4,897,672 | * | 1/1990 | Horiuchi et al. ..................... 347/236 |
| 4,992,890 | * | 2/1991 | Pinard et al. ..................... 358/489 X |
| 5,124,720 | * | 6/1992 | Schantz ................................. 347/19 |
| 6,081,316 | * | 6/2000 | Okamura et al. ................ 347/250 X |

* cited by examiner

*Primary Examiner*—David F. Yockey
(74) *Attorney, Agent, or Firm*—Ostrolenk, Faber, Gerb & Soffen, LLP (57) ABSTRACT

In a multi-beam drawing method in which drawing is performed with a plurality of light-emitting devices (LDs), it is detected whether any LD is damaged. Of a plurality of partial LD lines obtained by partitioning at a damaged LD or LDs, the partial LD line including the largest number of LDs is selected as an effective LD line for use in drawing. Spiral correction is performed by dividing image data to be supplied to the LDs into a plurality of virtual small images parallel to the sub-scanning direction which are shifted in a reverse direction to the sub-scanning direction.

6 Claims, 12 Drawing Sheets

| | EXAMPLE: SIXTH CHANNEL DAMAGED | FIRST TO FIFTH CHANNELS LIT-UP |
|---|---|---|
| 1ch | ○ | ○ |
| 2ch | ○ | ○ |
| 3ch | ○ | ○ |
| 4ch | ○ | ○ |
| 5ch | ○ | ○ |
| 6ch | ● | ◉ |
| 7ch | ○ | ◉ |
| 8ch | ○ | ◉ |
| 9ch | ○ | ◉ |
| 10ch | ○ | ◉ |

FIG. 6

| | EXAMPLE: EIGHTH CHANNEL DAMAGED | FIRST TO SEVENTH CHANNELS LIT-UP |
|---|---|---|
| 1ch | ○ | ○ |
| 2ch | ○ | ○ |
| 3ch | ○ | ○ |
| 4ch | ○ | ○ |
| 5ch | ○ | ○ |
| 6ch | ○ | ○ |
| 7ch | ○ | ○ |
| 8ch | ● | ◉ |
| 9ch | ○ | ◉ |
| 10ch | ○ | ◉ |

FIG. 7

| | EXAMPLE: FIFTH & EIGHTH CHANNELS DAMAGED | FIRST TO FOURTH CHANNELS LIT-UP |
|---|---|---|
| 1ch | ○ | ○ |
| 2ch | ○ | ○ |
| 3ch | ○ | ○ |
| 4ch | ○ | ○ |
| 5ch | ● | ◉ |
| 6ch | ○ | ◉ |
| 7ch | ○ | ◉ |
| 8ch | ● | ◉ |
| 9ch | ○ | ◉ |
| 10ch | ○ | ◉ |

FIG. 8

| | EXAMPLE: SECOND & NINTH CHANNELS DAMAGED | THIRD TO EIGHTH CHANNELS LIT-UP |
|---|---|---|
| 1ch | ○ | ◉ |
| 2ch | ● | ◉ |
| 3ch | ○ | ○ |
| 4ch | ○ | ○ |
| 5ch | ○ | ○ |
| 6ch | ○ | ○ |
| 7ch | ○ | ○ |
| 8ch | ○ | ○ |
| 9ch | ● | ◉ |
| 10ch | ○ | ◉ |

MULTI-BEAM DRAWING METHOD USING PARTIALLY DAMAGED LIGHT EMITTING DEVICES AND INCLUDING SPIRAL CORRECTION

BACKGROUND OF THE INVENTION

1. Field of the Invention

The present invention relates to methods and apparatus for drawing with multi-beam, and more specifically to a method and apparatus for drawing on a sensitive material or printing plate having a cylindrical shape and rotated about its center axis by applying thereto multi-beam emitted from a light-emitting device line which is composed of a plurality of light-emitting devices arranged along a sub-scanning direction parallel to the center axis and is moved along the sub-scanning direction.

2. Related Art Statement

To make a printing plate (a cylindrical printing plate with many cells engraved according to an image) for use in a rotary press, an original (original film) is conventionally made in advance and then exposed on the printing plate. In this case, drum-type scanners for scanning a film being fixed to a drum for rotation with multi-beam are generally used as image recording devices for making an original.

Figure 14:
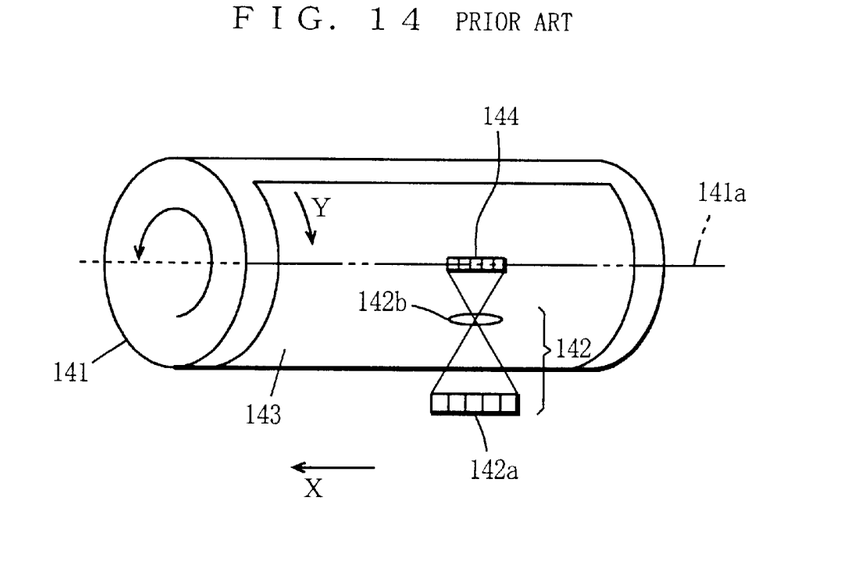
FIG. 14 is a schematic diagram showing the structure of main parts of a conventional multi-beam, drum-type scanner.

FIG. 14 is a diagram showing the structure of main parts of a conventional multi-beam (drum-type) scanner.

In FIG. 14, the conventional multi-beam scanner includes a drum 141 placed so that its center axis 141a is parallel to a sub-scanning direction indicated by an arrow X, and a multi-channel optical head 142.

The drum 141 is fixedly provided with a photosensitive material (film) 143 along its side surface. The multi-channel optical head 142 includes a plurality of light-emitting devices (LDs) 142a arranged along the sub-scanning direction X and a lens 142b for forming an image 144 out of beams emitted from the plurality of LDs 142a on a drum surface.

The drum 141 is driven by a motor not shown to rotate in reverse to a main-scanning direction indicated by an arrow Y, while the multi-channel optical head 142 is driven by another motor not shown to move along the sub-scanning direction X. At this time, the multi-channel optical head 142 moves a distance equal to the length of the image 144 while the drum 141 rotates once.

With the above described manner, a two-dimensional image is drawn in a spiral fashion onto the photosensitive material 143 (this drawing method is hereinafter referred to as spiral drawing).

In this way, the scanner of FIG. 14 scans the photosensitive material 143 with the multi-channel optical head 142 including the plurality of LDs 142a, thereby allowing high-speed drawing according to the number of LDs 142a.

In recent years, a Computer to Plate (CTP) system for drawing an image by directly applying laser beams to a printing plate has been widely employed for plate making instead of exposing the original onto a printing plate as described above. This CTP direct plate making eliminates processes of making and exposing an original, thereby allowing great reduction in time required for plate making.

In the CTP system, as the image recording device for drawing an image onto a printing plate, the scanner of FIG. 14 is used, for example, with a printing plate instead of the drum 141 and the plurality of high-power LDs 142a so as to engrave pits on the printing plate.

As a result of using the plurality of high-power LDs, however, the conventional multi-beam CTP scanner is prone to be out of order due to damage to part of the LDs, and therefore plate making operation cannot be performed until the damaged LD is repaired or exchanged. If drawing processing is performed with the damaged LD line (in which one or more LDs out of the plurality of LDs are damaged), an image obtained thereby is of poor quality, lacking a lot of lines.

Note that the above mentioned problem exists in other multi-beam scanners not for CTP, with varying frequencies of occurrence of LD damage.

Therefore, a drawing method or apparatus capable of drawing an image using multi-beam even with partially damaged LDs has been highly expected.

SUMMARY OF THE INVENTION

Therefore, an object of the present invention is to provide a multi-beam drawing method and apparatus capable of drawing with partially damaged LDs.

The present invention has the following features to attain the object above.

A first aspect of the present invention is directed to a multi-beam drawing method for drawing on a sensitive material or printing plate having a cylindrical shape and rotated about a center axis thereof by applying thereto multi-beam emitted from a light-emitting device line which is composed of a plurality of light-emitting devices arranged along a sub-scanning direction parallel to the center axis and is moved along the sub-scanning direction, the method comprising the steps of:

detecting damage to any of the light-emitting devices;

selecting one of a plurality of partial light-emitting device lines obtained by partitioning the light-emitting device line at a damaged light-emitting device as an effective light-emitting device line; and applying the multi-beam emitted from the partial light-emitting device line selected as the effective light-emitting device line to the photosensitive material or printing plate for drawing.

According to the first aspect, drawing can be made with partially damaged LDs. As a result, inconvenience that drawing cannot be made until exchange or repair of the damaged LD 12a is completed can be eliminated, allowing direct drawing onto the printing plate using vulnerable, high-power LDs.

According to a second aspect, in the first aspect, in the selecting step, a partial light-emitting device line including the largest number of light-emitting devices is selected from among the plurality of partial light-emitting device lines.

According to the second aspect, drawing can be made at high speed.

According to a third aspect, in the first aspect, in the multi-beam applying step, a moving speed of the light-emitting device line is changed according to the number of light-emitting devices included in the partial light-emitting device line.

According to a fourth aspect, in the third aspect, the moving speed of the light-emitting device line is changed so that the light-emitting device line is moved a distance equal to a length of an image to be formed on the photosensitive material or printing plate out of the multi-beam emitted from the partial light-emitting device line selected as the effective light-emitting device line while the photosensitive plate or printing plate rotates once.

A fifth aspect of the present invention is directed to a multi-beam drawing apparatus for drawing on a sensitive material or printing plate having a cylindrical shape and rotated about a center axis thereof by applying thereto multi-beam emitted from a light-emitting device line which is composed of a plurality of light-emitting devices arranged along a sub-scanning direction parallel to the center axis and is moved along the sub-scanning direction, the device comprising:

detecting means for detecting damage to any of the light-emitting devices;

selecting means for selecting one of a plurality of partial light-emitting device lines obtained by partitioning the light-emitting device line at a damaged light-emitting device as an effective light-emitting line; and     means for applying the multi-beam emitted from the partial light-emitting device line selected as the effective light-emitting device to the photosensitive material or printing plate for drawing.

According to the fifth aspect, drawing can be made with partially damaged LDs. As a result, inconvenience that drawing cannot be made until exchange or repair of the damaged LD 12a is completed can be eliminated, allowing direct drawing onto the printing plate using vulnerable, high-power LDs.

A sixth aspect of the present invention is directed to A recording medium recording a program to be executed in a multi-beam drawing apparatus for drawing on a sensitive material or printing plate having a cylindrical shape and rotated about a center axis thereof by applying thereto multi-beam emitted from a light-emitting device line which is composed of a plurality of light-emitting devices arranged along a sub-scanning direction parallel to the center axis and is moved along the sub-scanning direction, the program being for realizing on the multi-beam drawing apparatus an operating environment including the steps of:

detecting damage to any of the light-emitting devices;

selecting one of a plurality of partial light-emitting device lines obtained by partitioning the light-emitting device line at a damaged light-emitting device as an effective light-emitting device line; and     applying the multi-beam emitted from the partial light-emitting device line selected as the effective light-emitting device to the photosensitive material or printing plate for drawing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing a format of corrected channel parallel data obtained after correction by a spiral correction section 24 of FIG. 2;

DESCRIPTION OF THE PREFERRED EMBODIMENT

Figure 1:
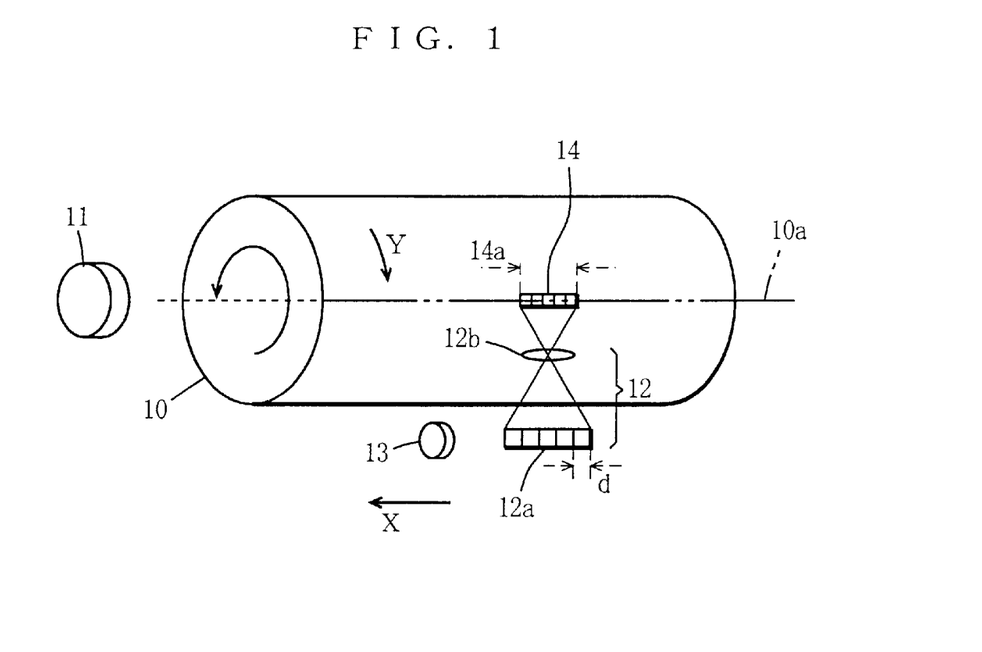
FIG. 1 is a schematic diagram showing the structure of main parts of a multi-beam, drum-type CTP scanner according to an embodiment of the present invention.
Figure 2:
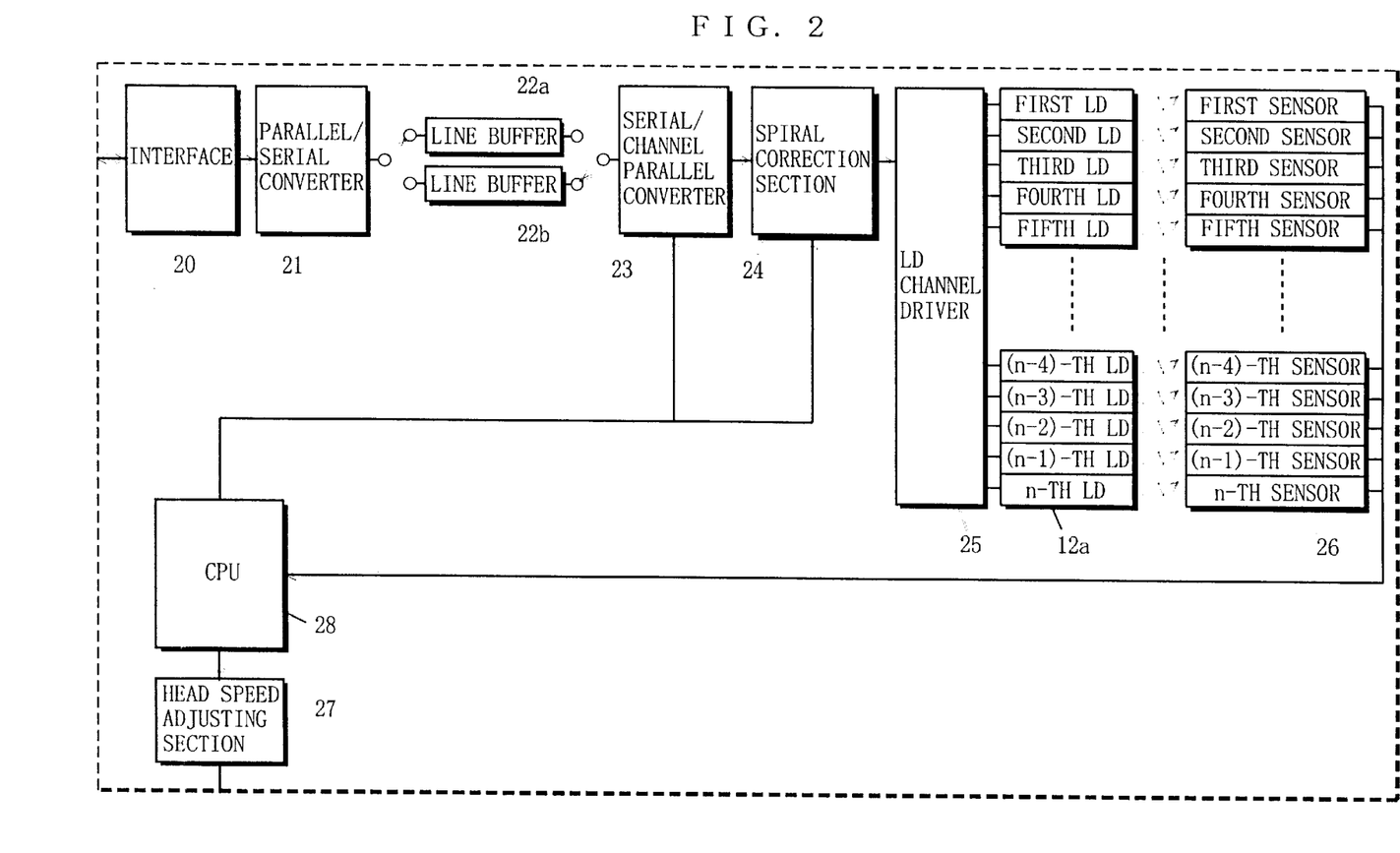
FIG. 2 is a block diagram showing the electrical structure of the scanner of FIG. 1.

FIG. 1 is a schematic diagram showing the structure of a multi-beam, drum-type CTP scanner according to an embodiment of the present invention, and FIG. 2 is a block diagram showing the electrical structure of the scanner of FIG. 1.

In FIG. 1, the multi-beam, drum-type CTP scanner (hereinafter simply referred to as multi-beam scanner) includes a cylindrical-shaped printing plate 10 whose center axis 10a is parallel to a sub-scanning direction shown by an arrow X, a plate drive motor 11 for rotating the printing plate 10 in a reverse direction to a main scanning direction shown by an arrow Y, a multi-channel optical head 12, and an optical head drive motor 13 for moving the multi-channel optical head 12 along the sub-scanning direction X.

The multi-channel optical head 12 includes a plurality of high-power light-emitting devices (LDs) 12a arranged along the sub-scanning direction X, and a lens 12b for forming an image 14 on a plate surface out of beams emitted from the plurality of LDs 12a.

The printing plate 10 is driven by the plate drive motor 11 to rotate in reverse to the main scanning direction Y, while the multi-channel optical head 12 is driven by the optical head drive motor 13 to move along the sub-scanning direction X. The multi-channel optical head 12 moves a distance equal to a length 14a of the image to be formed out of the multi-beam emitted from the plurality of LDs 12a (the product of a diameter d of the LD 12a, the number of LDs 12a and an optical magnification of the lens 12b) while the printing plate 10 rotates once. The distance moved while the printing plate 10 rotates once is hereinafter referred to as a moving speed of the optical head.

Figure 3:
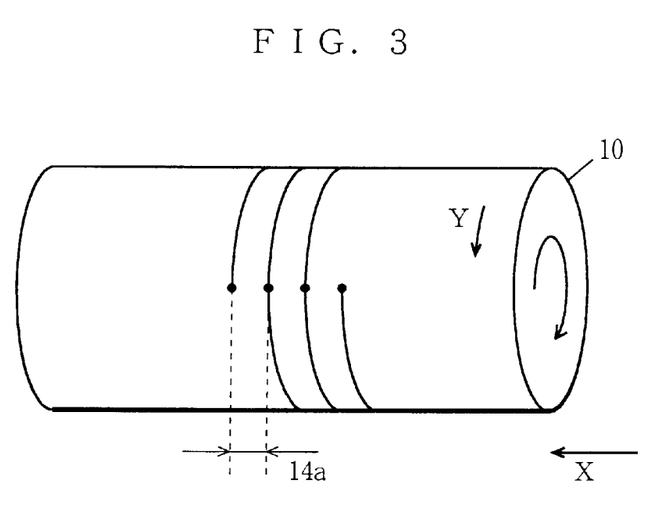
FIG. 3 is a diagram showing the concept of drawing a two-dimensional image along a spiral curve on a printing plate 10 of FIG. 1.

A two-dimensional image is thus drawn onto the printing plate 10 along a spiral curve (refer to FIG. 3).

The rotation speed of the printing plate 10 is selected before drawing by an operator from among predetermined alternatives according to the resolution of the image to be drawn. On the other hand, the moving speed of the multi-channel optical head 12 is determined before drawing by a CPU 28 (refer to FIG. 2) starts according to damage conditions of the plurality of LDs 12a.

In FIG. 2, the multi-beam scanner includes an interface 20, a parallel/serial converter 21, line buffers 22a and 22b, a serial/channel parallel converter 23, a spiral correction section 24, an LD channel driver 25, first to n-th LDs 12a, first to n-th sensors 26, a head speed adjusting section 27 and the CPU 28.

An overview of operation of the multi-beam scanner in FIG. 1 is first presented below.

Features of the scanner of FIG. 1 include:

(1) Correct image distortion due to drawing along a spiral curve (this feature is hereinafter referred to as spiral correction); and (2) Perform drawing processing even when part of LDs 12a included in the multi-channel optical head 12 is damaged.

When part of LDs 12 is damaged, the scanner of FIG. 1 performs drawing after adjusting the drive speed of the multi-channel optical head 12 and the amount of correction in spiral correction (described later) according to damage conditions of the LDs 12a.

Figure 4:
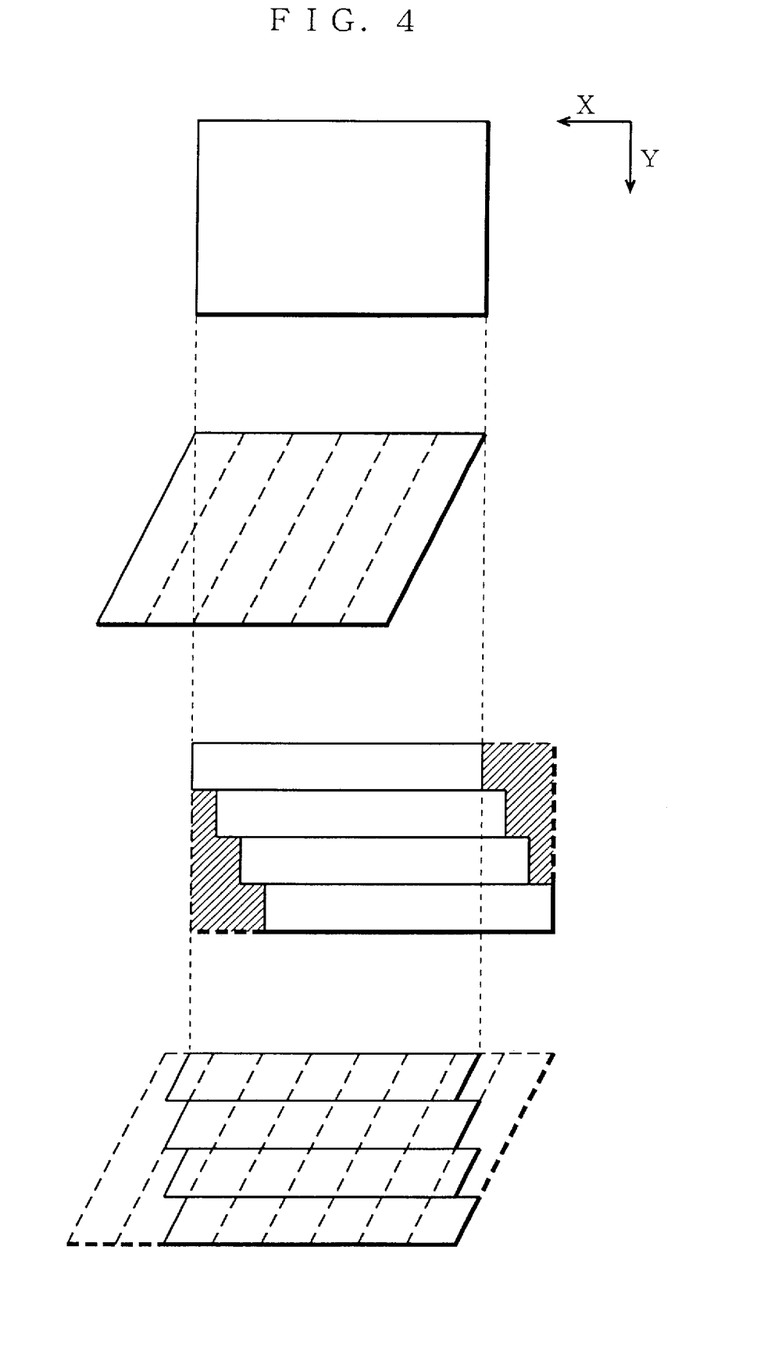
FIG. 4 is a diagram showing conceptual images to be obtained with and without spiral correction.

For the first feature, in the multi-beam scanner of FIG. 1, the conceptual images to be obtained with and without spiral correction are shown in FIG. 4.

As shown in FIG. 4, without spiral correction, an image (top in FIG. 4) which originally has a rectangular shape is distorted along the sub-scanning direction X (spiral distortion), resulting in a parallelogram (second from top in FIG. 4) whose right and left sides (not parallel to the sub-scanning direction X) are inclined toward the main scanning direction Y.

To avoid such problems, image data based on which multi-beam are generated is subjected to spiral correction. In spiral correction, each pixel data constructing the above image data is sequentially shifted in a reverse direction to the sub-scanning direction X according to a position in the main scanning direction Y of the pixel data (third from top in FIG. 4; Note that dummy data is put in hatched areas).

After the above spiral correction, the parallelogram (second from top) is divided so that the side in the main scanning direction Y is equally divided (in quarters, for example to obtain four parallelograms, resulting in an image (bottom in FIG. 4) in which corresponding vertexes of the obtained four parallelograms are arranged along a straight line parallel to the main scanning direction Y (shown by a dotted line).

The more the number of division, the more the image shown on the bottom of FIG. 4 approximates to the image shown on top in FIG. 4, that is, the original rectangular shape.

For the above second feature, assume that, of ten LDs 12a (first to tenth LDs) included in the multi-channel optical head 12 of ten channels, the sixth LD is damaged, for example. After the damage, the sixth and seventh to tenth LDs are abandoned (lit-off), and drawing is made using five (first to fifth) LDs 12a thereafter.

Figure 5:
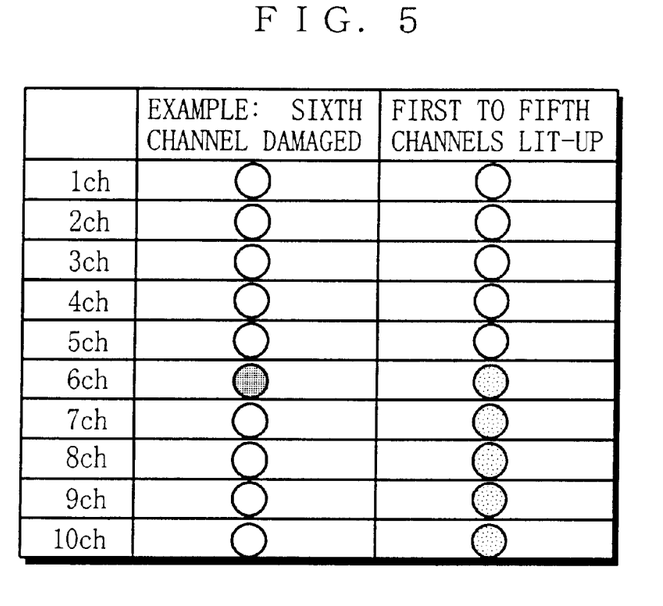
FIG. 5 is a diagram showing which LDs in the scanner (10 channels) of FIG. 1 are used for drawing when a sixth LD is damaged.

In other words, after the damage to the sixth LD, the above ten-channel optical head functions as a five-channel optical head (refer to FIG. 5). Therefore, spiral correction after the damage is also performed in the same manner as is the case for a five-channel optical head.

Assuming that the eighth LD of the above ten channel optical head is damaged, for example, the eighth and ninth to tenth LDs are abandoned after the damage, and drawing is made using seven (first to seventh) LDs 12a thereafter.

Figure 6:
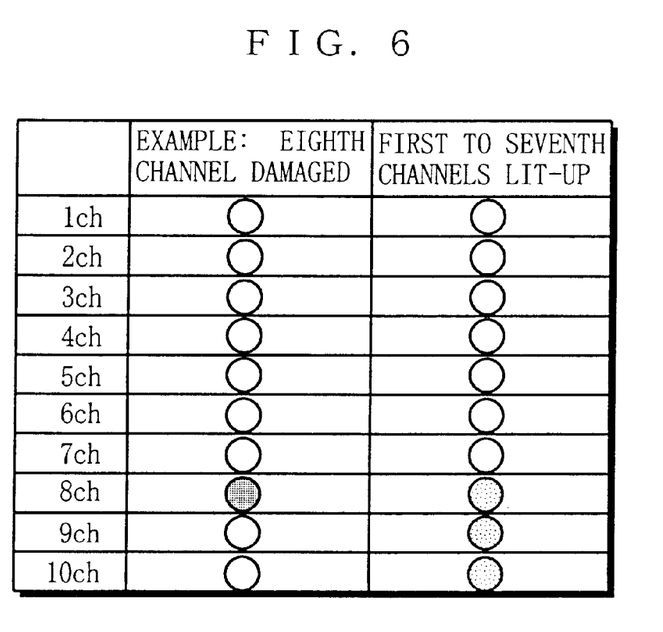
FIG. 6 is a diagram showing which LDs in the scanner (10 channels) of FIG. 1 are used for drawing when an eighth LD is damaged.

In other words, after the damage to the eighth LD, the above ten-channel optical head functions as a seven-channel optical head (refer to FIG. 6). Therefore, spiral correction after the damage is also performed in the same manner as is the case for a seven-channel optical head.

Figure 7:
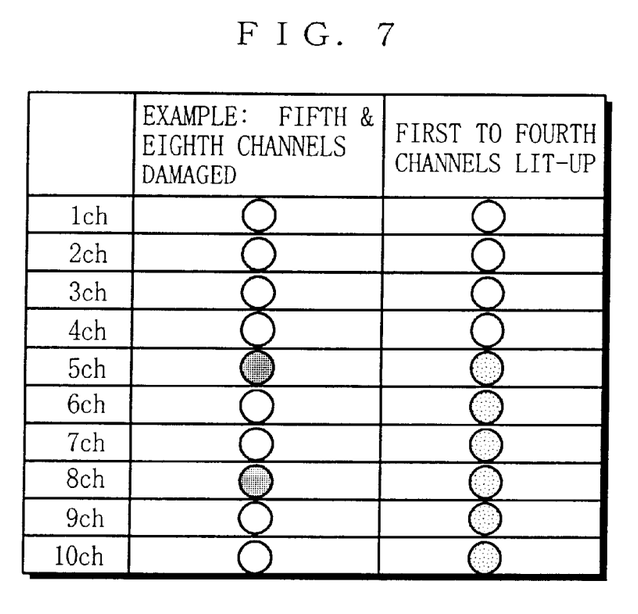
FIG. 7 is a diagram showing which LDs in the scanner (10 channels) of FIG. 1 are used for drawing when fifth and eighth LDs are damaged.

Furthermore, assuming that two LDs 12a, the fifth and eighth, of the above ten-channel optical head are damaged,
for example, these fifth and eighth, sixth and seventh, and ninth and tenth LDs are abandoned after the damage, and drawing is made using four (first to four) LDs 12a thereafter. That is, the above ten-channel optical head after the damage to the fifth and eighth LDs functions as a four-channel optical head (refer to FIG. 7). Therefore, spiral correction after the damage is also performed in the same manner as is the case for a four-channel optical head.

Still further, assuming that two LDs 12a, the second and ninth, of the ten-channel optical head are damaged, these second and ninth, and first and tenth LDs are abandoned after the damage, and drawing is made using six (third to eighth) LDs 12a thereafter.

Figure 8:
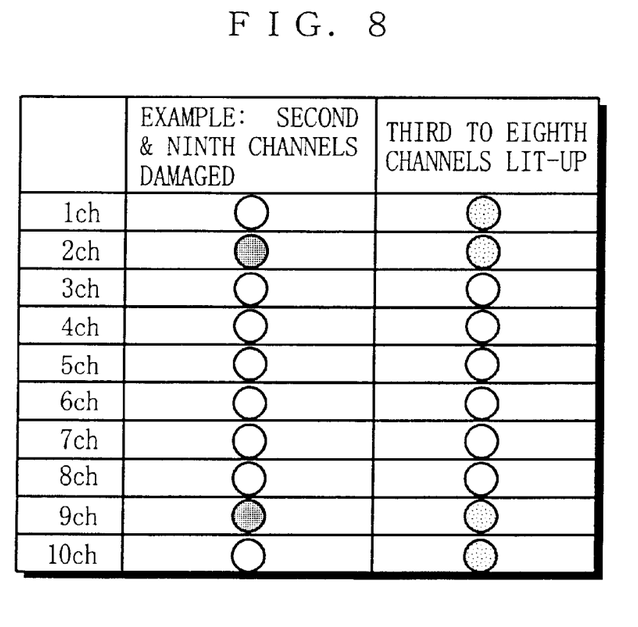
FIG. 8 is a diagram showing which LDs in the scanner (10 channels) of FIG. 1 are used for drawing when second and ninth LDs are damaged.

In other words, the above ten-channel optical head after the damage to the second and ninth LDs functions as a six-channel optical head (refer to FIG. 8). Therefore, spiral correction after the damage is also performed in the same manner as is the case for a six-channel optical head.

In summary, when k pieces of LDs 12a (where k=1, 2, ..., n−1) out of n pieces of LDs 12a (first to n-th LDs) of an n-channel optical head are damaged, drawing is made thereafter using an LD line (hereinafter referred to as effective LD line) which includes the largest number of LDs 12a among LD lines composed of one or more successive undamaged LDs and positioned between the damaged LDs. The number of LDs 12a included in the effective LD line is hereinafter referred to as the number of effective channels.

Note that, although drawing is most preferably made using the LD line including the largest number of LDs 12a selected from among the LD lines composed of one or more successive undamaged LDs, another LD selected from among those LD lines may also be used for drawing.

As seen from the above, when the number of effective channels becomes t (where t=1, 2, ..., n−1) due to damage to the LD 12a, the above n-channel optical head functions as a t-channel optical head. Therefore, spiral correction after the damage is performed in the same manner as is the case for a t-channel optical head (without damage).

Referring back to FIG. 2, operation of each block is now described.

In FIG. 2, the multi-beam scanner receives input of image data (parallel data in a predetermined format) through the interface 20. The interface 20 outputs the inputted parallel data to the parallel/serial converter 21 under the control of the CPU 28.

Figure 9:
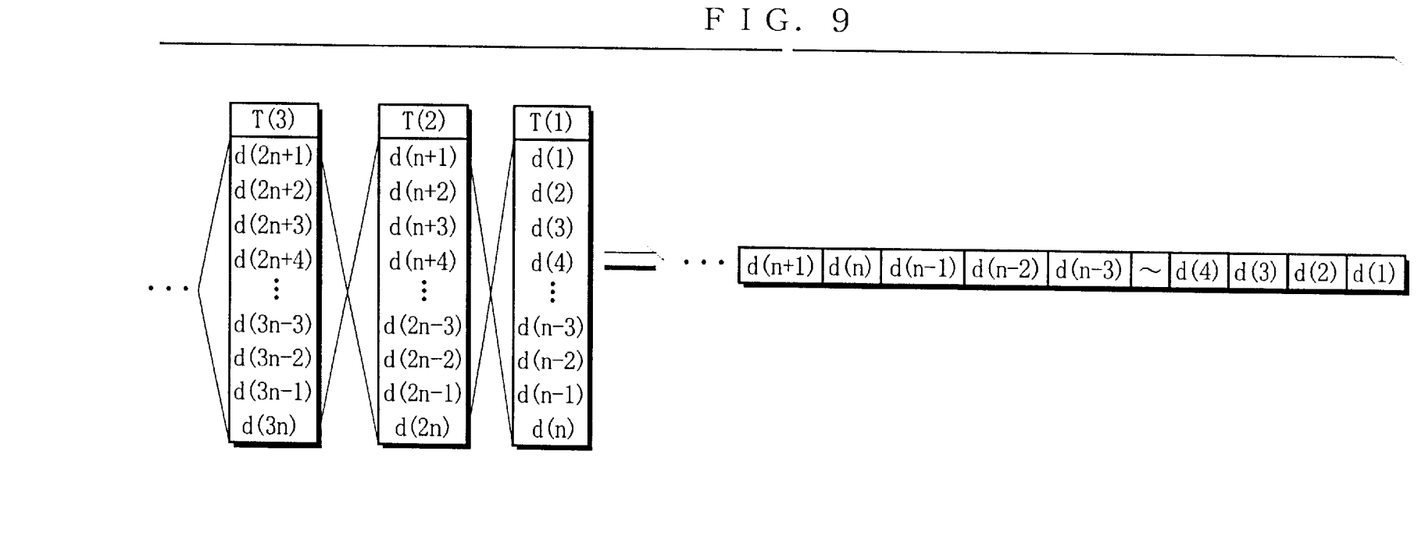
FIG. 9 is a diagram illustrating parallel/serial conversion in a parallel/serial converter 21 of FIG. 2.

The parallel/serial converter 21 performs parallel/serial conversion as shown in FIG. 9. More specifically, the image data to be inputted to the parallel/serial converter 21 has a parallel format in which a plurality of data strings {T(1), T(2), ..., T(m)} each including n pieces of pixel data are arranged in parallel, where n represents the number of channels of the multi-channel optical head 12 and m represents the number of pixels of the image in the main scanning direction Y.

The parallel/serial converter 21 performs conversion by arranging all bits included in the data strings {T(1), T(2), ..., T(m)} in a single line according to a predetermined sequence, and then outputs the serial data obtained by conversion to the line buffer 22a or 22b.

The line buffers 22a and 22b constitute a single toggle buffer. More specifically, while serial data is being written in the line buffer 22a, for example, already-written serial data is being read from the line buffer 22b.

The serial/channel parallel converter 23 converts, under the control of the CPU 28, the serial data read from the line buffer 22a, or 22b, into channel parallel data in a parallel format suitable for spiral drawing by the n channel optical head (12). The format of the channel parallel data obtained by serial/channel parallel conversion is shown in FIG. 10.

Figure 10:
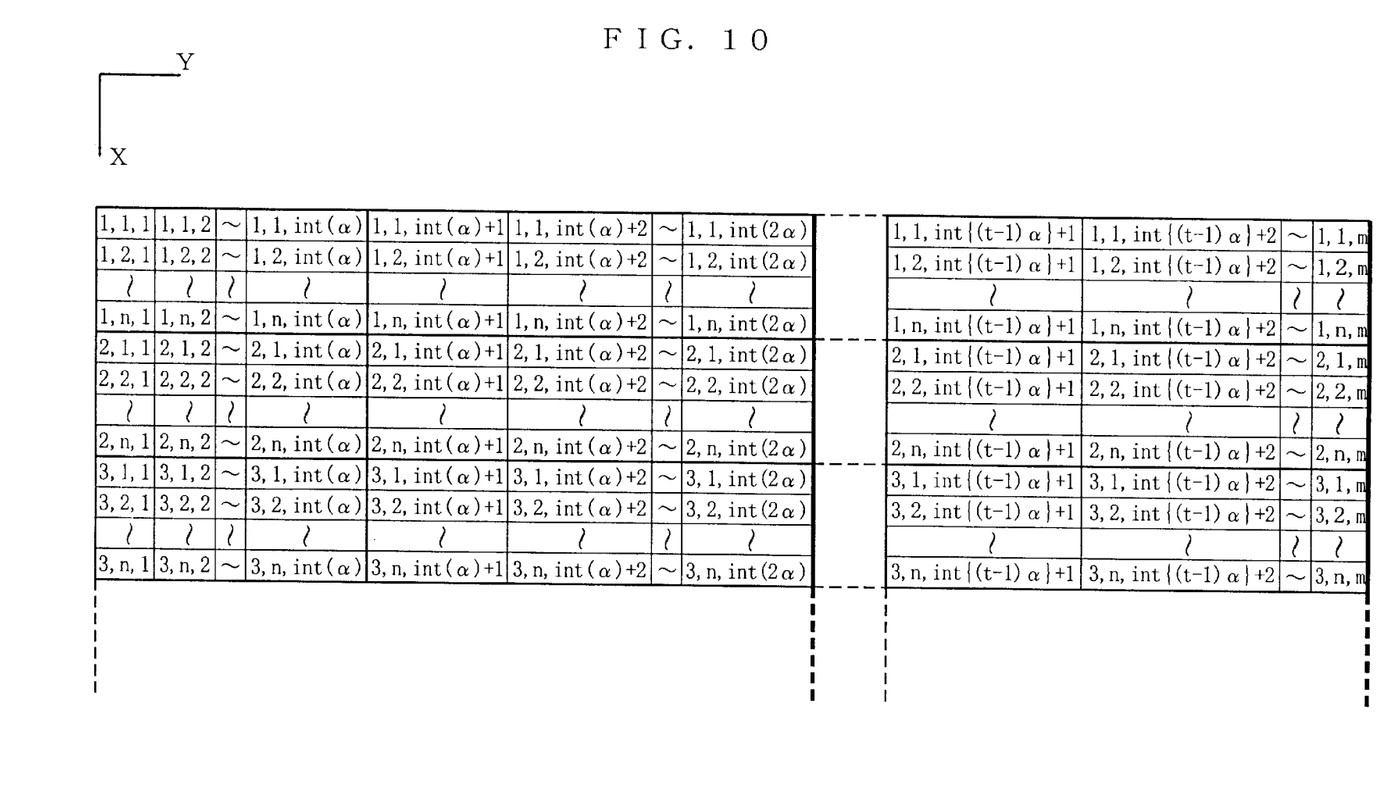
FIG. 10 is a diagram showing a format of channel parallel data obtained after conversion by the serial/channel parallel converter 23 of FIG. 2.

In FIG. 10, n pieces of pixel data having m pixels in the main scanning direction X by n channels in the sub-scanning direction Y constructs a group. Each group corresponds to one main scanning.

Herein, int ($\alpha$) represents a maximum integer less than $\alpha$, where $\alpha=m/n$. Each field has three numbers representing a group number, a channel number (in the sub-scanning direction X) and a pixel number (in the main scanning direction Y), from left to right (the same goes for FIG. 11).

When the number of effective channels becomes t due to the damage to the LD 12a, t is substituted for n, that is, $\alpha'$ (=m/t) for $\alpha$ (=m/n), in the channel parallel data of FIG. 10.

The spiral correction section 24 subjects the channel parallel data obtained after conversion by the serial/channel parallel converter 23 to spiral correction under the control of the CPU 28.

With the spiral correction, the channel parallel data is sequentially shifted every int ($\alpha$) pixel by one pixel in the reverse direction to the sub-scanning direction X. The format of the corrected channel parallel data obtained after spiral correction is shown in FIG. 11. In FIG. 11, the pixel data from {int ($\alpha$)+1}-th to {int (2$\alpha$)}-th pixels is obtained by shifting the pixel data from the first to {int ($\alpha$)}-th pixels by one channel in the reverse direction to the sub-scanning direction X. Similarly, the pixel data from {int (2$\alpha$)+1}-th to {int (3$\alpha$)}-th pixels is obtained by shifting the pixel data from {int ($\alpha$)+1}-th to {int (2$\alpha$)}-th pixels by one channel in the reverse direction to the sub-scanning direction X.

The LD channel driver 25 drives the first to n-th LDs 12a according to the corrected channel parallel data from the spiral correction section 24. The first to n-th sensors 26 detect a beam from the first to n-th LDs 12a, respectively. The head speed adjusting section 27 controls the optical head drive motor 13 in response to an instruction from the CPU 28 to adjust the moving speed of the multi-channel optical head 12.

The CPU 28 subjects the serial/channel parallel converter 23, the spiral correction section 24 and the head speed adjusting section 27 to initialization processing (described later) based on the results of detection by the first to n-th sensors 26. A program for initialization by the CPU 28 is previously stored in ROM (not shown) provided for the CPU 28. Note that the above program may be supplied to the scanner of FIG. 1 through a portable recording medium such as a floppy disk and CD-ROM or a communication circuit. In this case, the supplied program is transferred to and stored in RAM (not shown) provided for the CPU 28.

Described below is operation of the above structured multi-beam scanner. It is herein assumed that the number of multi-beam channels is 10 (n=10).

Figure 12:
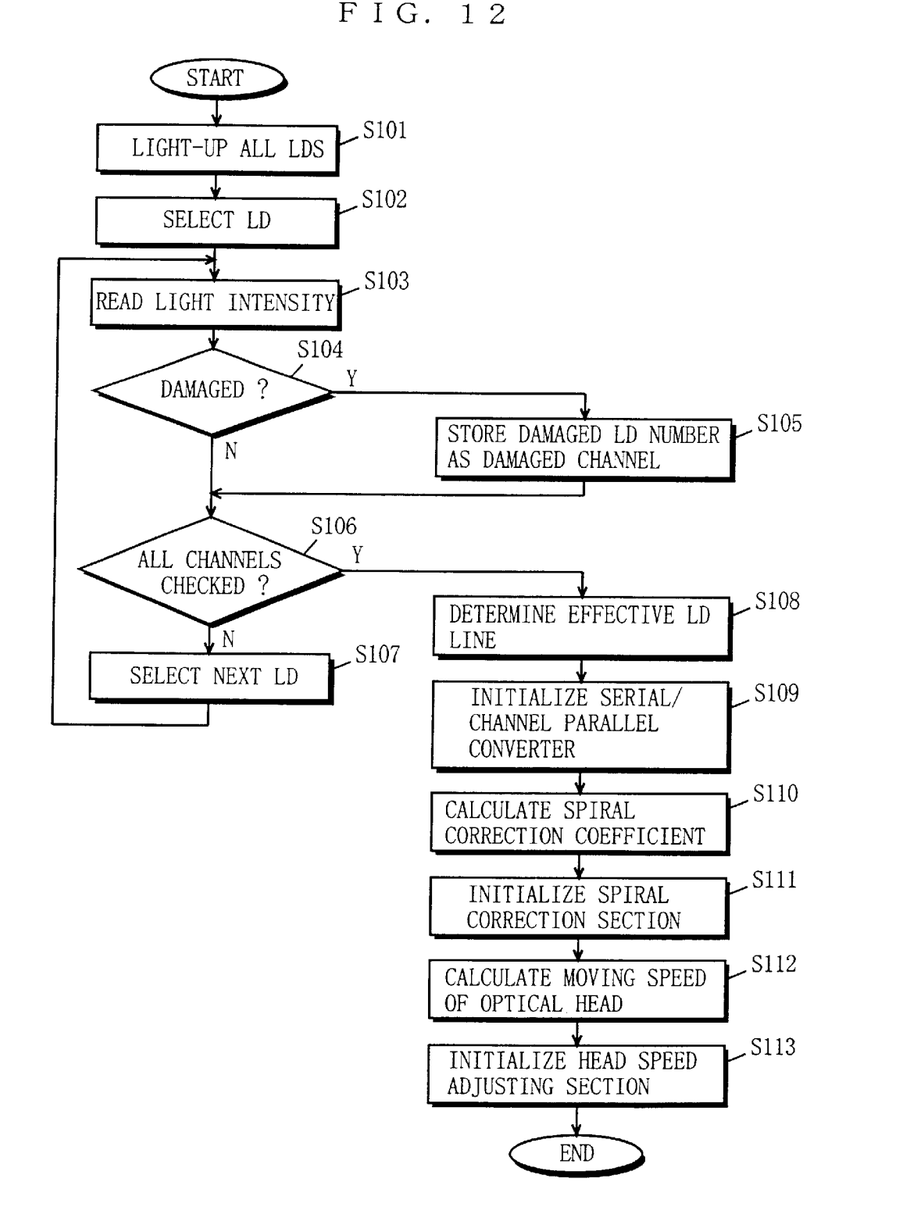
FIG. 12 is a flow chart showing initialization processing to be executed when a CPU 28 of FIG. 2 starts drawing.

FIG. 12 is a flow chart showing initialization processing to be executed when the CPU 28 of FIG. 2 starts drawing.

In FIG. 12, when drawing starts, the CPU 28 lights up all of the LDs 12a (first to tenth LDs) (step S101). The CPU 28 then selects any one of the LDs 12a (the first LD, in this example) to be checked (step S102), and instructs the sensor 26 (the first sensor) corresponding to the selected (first) LD 12a to measure light intensity from the (first) LD 12a (step S103).

In response, the (first) sensor 26 measures light intensity from the (first) LD 12a and then notifies the CPU 28 of the measurement value.

The CPU 28 next compares the notified, measurement value with a predetermined threshold to determine whether the (first) LD 12a is damaged (step S104). When the determination result is positive, the CPU 28 stores the LD number (1) of the (first) LD 12a therein as a damaged channel number (step S105), and then goes to step S106.

When the determination result in step S104 is negative, the procedure goes to step S106.

In step S106, it is determined whether all of the LDs 12a have been subjected to damage check. When the determination result is negative, the CPU 28 selects the next LD 12a (second LD, in this example) (step S107), and then returns to step S103 to repeat the same processing as described above (damage check).

When it is determined that all LDs have been checked, the CPU 28 determines the LD line for use in drawing, that is, effective LD line, based on the damaged channel number stored in step S105 (step S108).

The determination processing in step S108 is performed as follows, for example.

(1) When no LD is damaged, the LD line including the first to tenth LDs is determined as the effective LD line.

(2) When one LD, for example, a k-th LD (where k is an arbitrary integer which satisfies 1<k<10) is damaged, the number of LDs in the LD line including the first to (k−1)-th LDs and the number of LDs in the LD line including (k+1)-th to tenth LDs are compared to each other. Of these two LD lines, the one including more LDs is determined as the effective LD line.

Note that, when the first LD is damaged, the LD line including the second to tenth LDs is determined as the effective LD line, while the LD line including the first to ninth LDs is determined when the tenth LD is damaged.

(3) When two LDs, for example, k-th and k'-th LDs (where k and k' are arbitrary integers which satisfy 2<k+1<k'<10) are damaged, the number of LDs in the LD line including the first to (k−1)-th LDs, the number of LDs in the LD line including (k+1)-th to (k'−1)-th LDs and the number of LDs in the LD line including (k'+1)-th to tenth LDs are compared. Of these three LD lines, the one including the largest number of LDs is determined as the effective LD line.

Note that, when the first and k'-th LDs (where k' is an arbitrary integer which satisfies 2<k'<10) are damaged, the number of LDs in the LD line including the second to (k'−1)-th LDs and the number of LDs in the LD line including (k'+1)-th to tenth LDs are compared. Of these two LD lines, the one including more LDs is determined as the effective LD line.

Furthermore, when k-th and tenth LDs (where k is arbitrary integer which satisfies 1<k<9) are damaged, the number of LDs in the LD line including the first to (k−1)-th LDs and the number of LDs in the LD line including (k+1)-th to ninth LDs are compared. Of these two LD lines, the one including more LDs is determined as the effective LD line.

Still further, when the first and tenth LDs are damaged, the LD line including the second to ninth LDs is determined as the effective LD line.

Also when three or more LDs are damaged, the effective LD line can be determined in the same manner as described above. More specifically, when one or more LDs 12a are damaged in the LD line composed of all of the LDs 12a included in the multi-channel optical head 12, the damaged LDs 12a serve as boundaries, forming a plurality of LD lines composed of only undamaged LDs 12a (partial LD lines). Of these partial LD lines, the one including the largest number of LDs 12a is determined as the effective LD line.

After determining the effective LD line, the CPU 28 subjects the serial/channel parallel converter 23 to initialization for drawing so that the serial/channel parallel converter 23 converts the serial data read from the line buffer 22a, or 22b, into channel parallel data suitable for spiral drawing with the effective LD line determined in step S108 (step S109).

For example, when the effective LD line determined in step S108 includes eight LDs (the third to tenth LDs; the second LD is damaged in this case) and spiral drawing is thus performed with eight channels, the above initialization brings the serial/channel parallel converter 23 into operation of converting the serial data into channel parallel data having data width for eight channels (pixels) in the sub-scanning direction X.

Next, the CPU 28 calculates a spiral correction coefficient suitable for spiral drawing with the effective LD line determined in step S108 (step S110).

Figure 13:
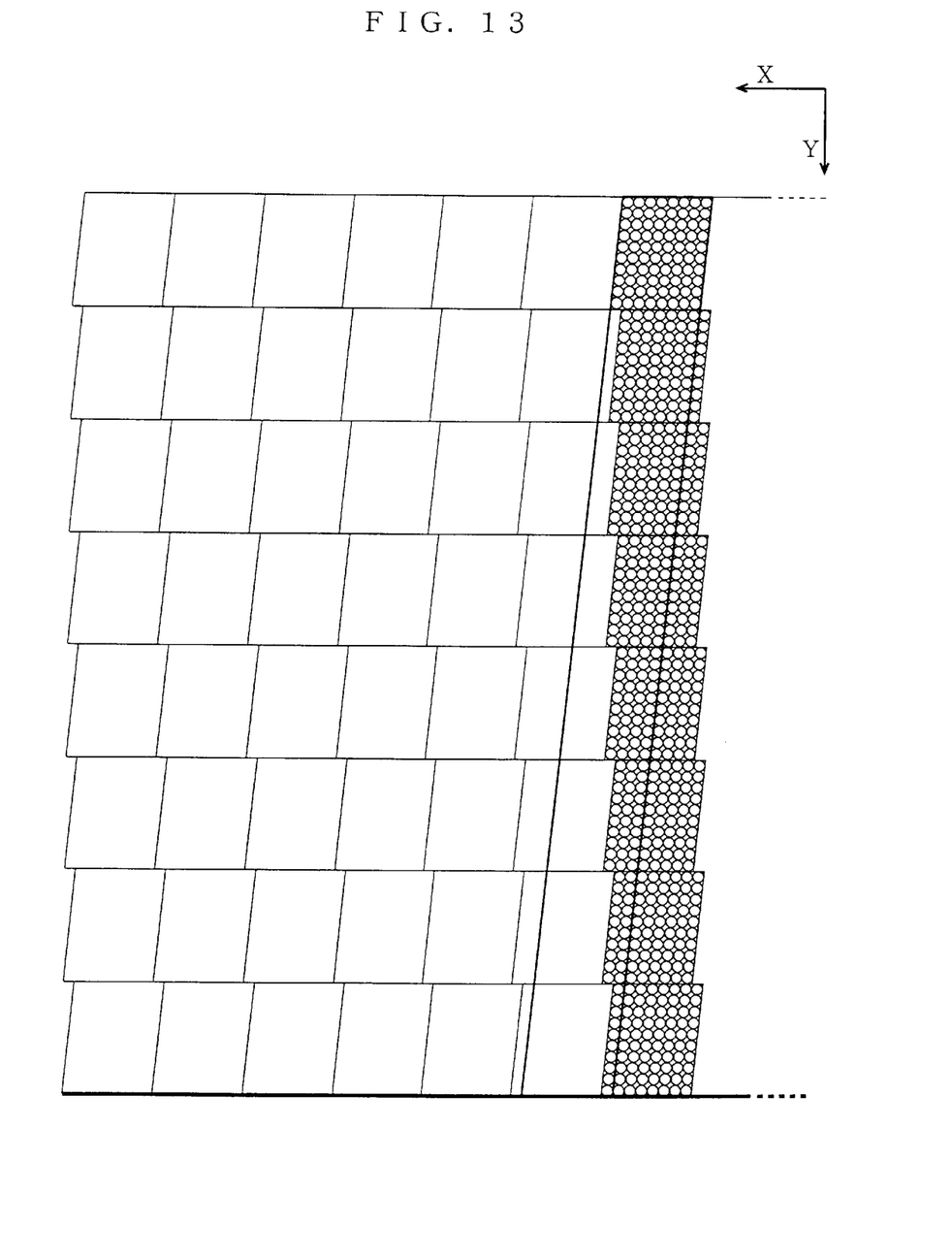
FIG. 13 is a diagram showing a conceptual image to be printed on paper using a printing plate 10 with an image drawn by the scanner of FIG. 1.

The spiral correction coefficient described herein indicates the number of pixels by which spiral correction, in which pixel data is sequentially shifted by one channel in the reverse direction to the sub-scanning direction X, is executed in the main scanning direction Y onto the channel parallel data as shown in FIG. 13. Therefore, the spiral correction coefficient is represented by int (m/t), where m is the length of the image data in the main scanning direction Y and t is the number of LDs included in the effective LD line is (that is, drawing is made with t-channels).

The CPU 28 calculates the spiral correction coefficient in step S110 based on the data size of the image in the main scanning direction Y and the number of LDs included in the effective LD line determined in step S108, as follows.

For example, when an image of 80 pixels in the main scanning direction Y is to be drawn with eight channel beams, the spiral correction coefficient is calculated as int (80/80)=10. At this time, in the channel parallel data after spiral correction, the data from the eleventh to twentieth pixels along the main scanning direction Y is obtained by shifting the data from the first to tenth pixels by one channel in the reverse direction to the sub-scanning direction X. Similarly, the data from the twenty-first to thirtieth pixels is obtained by shifting the data from the eleventh to twentieth pixels by one channel in the reverse direction to the sub-scanning direction X.

The CPU 28 then subjects the spiral correction section 24 to initialization processing so that the spiral correction section 24 performs spiral correction suitable for spiral drawing with the effective LD line determined in step S108 based on the spiral correction coefficient calculated in step S110 (step S111).

The CPU 28 then calculates the moving speed of the optical head suitable for spiral drawing with the effective LD line determined in step S108 (step S112).

Calculation in step S112 is performed as follows, for example.

For spiral drawing with the effective LD line determined in step S108, the multi-channel optical head 12 is moved along the sub-scanning direction X a distance equal to the length of the image to be formed out of the multi-beam from the effective LD line (the product of the diameter d of one LD 12a, the number of LD 12a included in the effective LD line and the optical magnification of the lens 12b) while the printing plate 10 rotates once.

Therefore, the CPU 28 calculates the moving speed of the optical head as {t*d*(optical magnification)}, based on the number t of LD 12a included in the effective LD line determined in step S108, the diameter of LD 12a and the optical magnification of the lens 12b.

The CPU 28 next subjects the head speed adjusting section 27 to initialization so that the multi-channel optical head 12 moves at the speed calculated in step S112 (step S113), and then ends processing.

Note that, in step S113, the CPU 28 performs initial position adjustment on the multi-channel optical head 12 as well as initialization on the head speed adjusting section 27. In initial position adjustment, the CPU 28 adjusts the position of the multi-channel optical head 12 in advance so that, when a beam from the LD 12a (the tenth LD, in this example) which is positioned closest to the direction of movement among the LDs 12a included in the effective LD line forms an image at a position to which a beam from the first LD is applied when no damage is observed (original drawing start position).

After the CPU 28 completes the above mentioned initialization processing, the scanner of FIG. 1 starts drawing operation.

More specifically, the image data supplied through the interface 20 to the scanner of FIG. 1 (raster scan parallel data, for example) is once converted into serial data by the parallel/serial converter 21, and then written into the line buffer 22a.

Subsequent to being written into the line buffer 22a, the image data is written into the line buffer 22b. At the same time, previously written serial data is also read from the line buffer 22a.

The serial data read from the line buffer 22a, is converted into channel parallel data suitable for spiral drawing with multi-beam (eight channel beams, in this example), by the serial/channel parallel converter 23.

The channel parallel data obtained after conversion by the serial/channel parallel converter 23 is given to the spiral correction section 24 for spiral correction. More specifically, the channel parallel data having the data length of 80 pixels in the main scanning direction Y is sequentially shifted every ten pixels along the main scanning direction Y by one channel in the reverse direction to the sub-scanning direction X.

The channel parallel data after spiral correction outputted from the spiral correction section 24 is given to the LD channel driver 25. The LD channel driver 25 drives the effective LD line composed of eight LDs 12a excluding the damaged second LD and the abandoned first LD, that is, the third to tenth LDs 12a, according to the given data. In response, the third to tenth LDs 12a emit beams.

The beams from the third to tenth LDs 12a are converged by the lens 12b to form an image on the printing plate 10 which is driven by the plate drive motor 11 for rotation at a constant speed. On the other hand, the multi-channel optical head 12 is driven by the optical head drive motor 13 to move along the sub-scanning direction X. At this time, since the optical head drive motor 13 is under the control of the head speed adjusting section 27 initialized as described above, the multi-channel optical head 12 moves at a speed suitable for spiral drawing with eight channels. As a result, a two-dimensional image is drawn onto the printing plate 10.

Even though a rectangular is to be printed on printing paper using the printing plate 10 with the image drawn obtained as described above, for example, a printed image, which is supposed to be a rectangular, has a shape, as shown in FIG. 13, in which eight congruous parallelograms (each parallelogram is constituted of eight pixels in the sub-scanning direction Y by ten pixels in the main scanning direction X, that is, eighty pixels) inclined along the main scanning direction Y are layered along the main scanning direction Y. The corresponding vertexes of the parallelograms are on a line parallel to the length of the printing paper, while the upper side of the top parallelogram and the bottom side of the bottom parallelogram are parallel to the lateral direction of the printing paper. In short, the printed image is not inclined to the lateral and vertical directions of the printing paper.

Described next is dummy data (refer to the hatched parts shown in the third image from top of FIG. 4) required for spiral correction.

In FIG. 13, the area surrounded by a thick line is drawn in one main scanning. (80*8) pixels shown by ○ marks belong to the same group in the channel serial data before spiral correction. When the pixels of the same group are subjected to spiral correction, part of the pixels is shifted to the adjacent group to be pushed off outside of the area surrounded by the thick line. The pushed-off, (10+20+ . . . +70) pixels are drawn not by the main scanning for drawing the internal area surrounded by the thick line, but by another main scanning (precisely, immediately-preceding main scanning).

Therefore, in each of first and last main scannings, (10+20+ . . . +70) pieces of image data are lacking. The scanner of FIG. 1 therefore previously stores dummy data in ROM or the like not shown, and draws the lacking image data using the dummy data.

As described above, in the present embodiment, multi-beam drawing can be performed even when part of the plurality of LDs 12a is damaged. As a result, inconvenience that drawing cannot be done until exchange or repair of the damage LD 12a is completed can be eliminated, allowing direct drawing onto the printing plate using vulnerable, high-power LDs.

Furthermore, in the present embodiment, spiral correction is made so that pixel data included in the channel parallel data for multi-beam generation is sequentially shifted along the sub-scanning direction X, thereby allowing multi-beam drawing without spiral distortion. In addition, the image drawn on the printing plate 10 is not inclined to, for example, the main scanning direction Y.

In the present embodiment, an image is drawn on the printing plate 10 with the LDs 12a. The present invention, however, may also be applied to the case in which, as in the scanner of FIG. 14, an image may be drawn on the photosensitive material (film) 143 being fixed to a dram, using the LDs 142a. Although power lower than the LD 12a is enough for the LDs 142a, and thus the frequency of damage to the LD 142a, is low, it is also preferable in this case to allow drawing with partially damaged LDs 142a.

Furthermore, other high-power, light-emitting devices such as a $CO_2$ laser may be used instead of the LDs 12a.

While the invention has been described in detail, the foregoing description is in all aspects illustrative and not restrictive. It is understood that numerous other modifications and variations can be devised without departing from the scope of the invention.

What is claimed is:

1. A scanning method performed, comprising:
   providing an object to be scanned which is rotatable around a rotating axis and having a cylindrical shape;
   providing rotating means for rotating said object to be scanned;
   providing a plurality of light-emitting devices arranged in a line and simultaneously applying a plurality of beams emitted therefrom onto said object to be scanned;
   providing image data supply means for supplying image data to said plurality of light-emitting devices;
   providing sub-scanning means for moving said plurality of light-emitting devices in a sub-scanning direction which is parallel to the rotating axis of said object to be scanned so that said plurality of light-emitting devices scan a surface of said object to be scanned in a spiral fashion;
   detecting damage to any of said light-emitting devices;
   selecting at least one of a plurality of partial light-emitting device lines obtained by partitioning said light-emitting device line at a damaged light-emitting device;
   processing image data of a rectangular Wage by dividing said image data into image data of a plurality of virtual small images parallel to the sub-scanning direction based on the number of light-emitting devices included in said partial light-emitting device line and sequentially shifting the plurality of virtual small images in a reverse direction to the sub-scannig direction in accordance with positions of the plurality of virtual small images in a main scanning direction; and
   scanning with the partial light-emitting device line selected in said selecting step based on the image data processed in said image data processing step.

2. The scanning method, as claimed in claim 1, wherein said object to be scanned is a photosensitive material being fixed around a rotatable drum or a surface thereof.

3. The scanning method, as claimed in claim 2, wherein said damage detecting step comprises the steps of:
   measuring intensity of light from said plurality of light-emitting devices; and
   comparing the measured intensity of light with a predetermined threshold.

4. The scanning method, as claimed in claim 2, wherein in said selecting step, a partial light-emitting device line including the largest number of light-emitting devices is selected from among the plurality of partial light-emitting devices lines obtained by partitioning the light-emitting device lines at the damaged light-emitting device as an effective light-emitting device line.

5. The scanning method, as claimed in claim 2, wherein a moving speed of said light-emitting device line is changed according to the number of light-emitting devices included in the partial light-emitting device line when a plurality of beams emitted from the partial light-emitting device line selected as said effective light-emitting device line are applied to said object to be scanned.

6. The scanning method, as claimed in claim 5, wherein a moving speed of said light-emitting device line is a speed at which said selected partial light-emitting device line moves, along the sub-scanning direction, over a distance equal to a length of an image to be formed on said object by the plurality of beams emitted from the partial light-emitting device line while said object to be scanned rotates once.

\* \* \* \* \*